3,111,388
METHOD FOR TESTING ELECTRICAL INSTRU-
MENTALITIES FOR INCIPIENT FAULT
Arnold L. Horelick, Bridgeville, Homer H. Wagner, Houston, and John C. Lynch, Canonsburg, Pa., assignors to McGraw-Edison Company, Milwaukee, Wis., a corporation of Delaware
Filed June 13, 1960, Ser. No. 35,636
13 Claims. (Cl. 23—232)

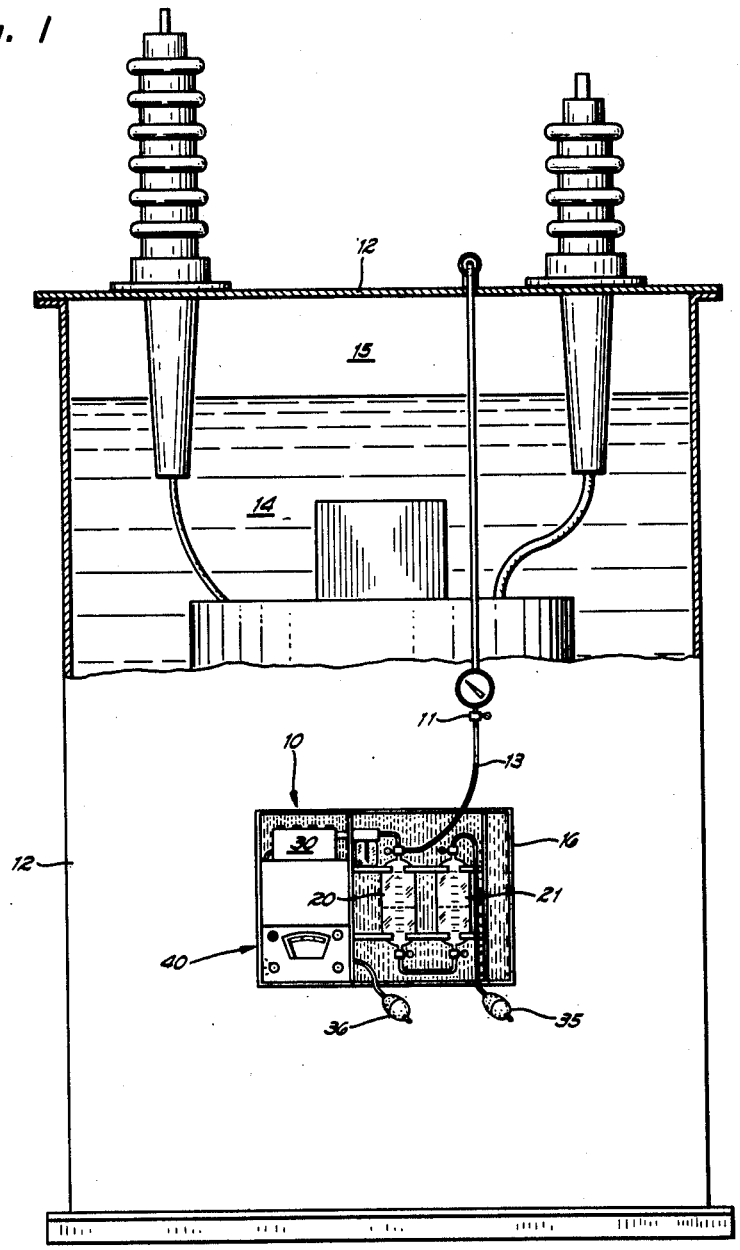

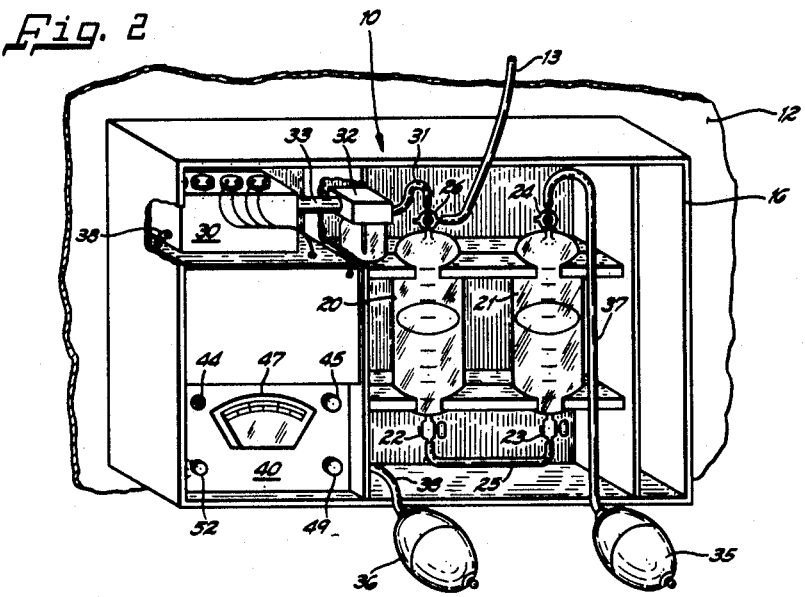
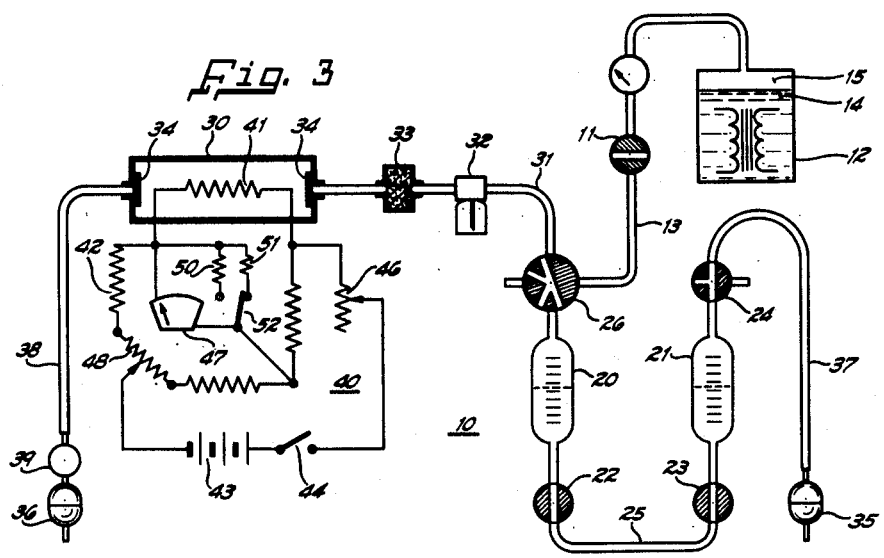
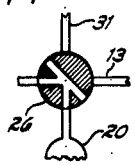
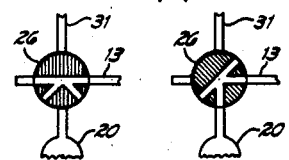
INVENTORS.
ARNOLD L. HORELICK
HOMER H. WAGNER
JOHN C. LYNCH
ATTORNEY United States Patent Office 3,111,388
Patented Nov. 19, 1963

This invention relates generally to oil-filled electrical instrumentalities having an inert gas cushion above the oil and, more particularly, it relates to a method and apparatus for testing such units for electrical fault.

The invention was developed primarily for detecting and evaluating low energy, incipient fault in oil-filled transformers of the inert gas space type, and it is in this connection that the novel method and apparatus are discussed herein. However, it will be obvious to those skilled in the art that the invention can be used to test other electrical units having an inert gas cushion, such as, for example, bushings, reactors, capacitors, selector switches, etc. Furthermore, the fault testing is not limited to low energy, incipient fault but instead can be used for detecting and evaluating any internal electrical fault which causes thermal decomposition of oil or solid insulation into gaseous products.

"Low energy" electrical faults are those operating discrepancies of insufficient magnitude to be detected with equipment activated by differential in voltage or current flow. "Testing" refers not only to fault detection but also to the evaluation and periodic determination of the stage or seriousness of the fault. The term "failure" as used herein shall be understood to mean a transformer breakdown which renders the unit incapable of further operation without repair.

Low-energy transformer faults can in time become serious and may even cause an eventual failure of the system. It is therefore extremely important from a preventative maintenance standpoint for an electrical utility to be able to detect and accurately evaluate such faults in their incipient stages.

The importance of detecting and evaluating "incipient" fault in transformers extends much further than the problem of minimizing damage to the units themselves. Knowing of an impending failure, a utility can plan its outages ahead of time on a non-emergency basis. Management has chance to determine the best place from which to route power to the affected customers without severely taxing the capacities of other electrical power companies. Actual outage times can be cut to the minimum so that there is but slight inconvenience to the customers and, consequently, little impairment of customer good will. Furthermore, the threat of injury to persons and equipment in the surrounding area from secondary explosions can be avoided, either by taking the unit out of operation or, if this is not possible, by periodically purging the gas phase of any explosive gases accumulating therein.

Notwithstanding the many advantages of being able to detect and evaluate incipient fault, prior to the time of this invention there was no satisfactory method or apparatus for testing for such fault in oil-filled electrical transformers having an inert gas cushion above the oil.

The fact that operating discrepancies (i.e., electrical fault) in transformers almost invariably cause gases to be generated has long been recognized in the electrical industry. The gases are formed by thermal decomposition of oil and/or solid insulation due to overheating in the area of the fault. This principle has, in fact, found wide application in many different types of transformer protective equipment. However, none of the prior art protective devices for transformers of the inert gas space type is capable of providing a positive indication that gas is being generated during the early stages of a fault.

The Buchholz relay has been used for many years to detect incipient fault in oil-filled electrical transformers which do not have an inert gas cushion above the oil. Gases evolved from the oil are trapped by an accumulator element of the relay, and after a fixed volume of gas has been accumulated the relay operates, indicating possible incipient fault. The Buchholz relay itself does not provide a positive indication of incipient fault because it will operate after trapping a fixed volume of any gas. Thus when a transformer is first put into operation, the relay may give many false indications of trouble as gases initially dissolved in the oil are evolved. Additional tests must therefore be made on the trapped gas to determine if in fact it does contain gaseous products of thermal decomposition.

The Buchholz relay cannot be used on oil-filled transformers having an inert gas cushion above the oil, because in such units the gaseous products of thermal decomposition evolve directly into the inert gas space and therefore cannot be trapped in a gas accumulator device.

Pressure relays of the total-pressure and rate-of-rise, sudden-pressure types are commonly used for protecting transformers of the inert gas space type. However, such devices are not sensitive enough to detect transformer faults in their incipient stages. By the time a pressure relay operates, a failure usually has either occurred or else is imminent. Furthermore, pressure relays are incapable of distinguishing between types of gas and therefore respond to pressure changes wholly unrelated to electrical fault.

Indicators responsive to one or more of the gaseous products of thermal decomposition (example: acetylene) have also been used for detecting electrical fault in oil-filled transformers having an inert gas layer above the oil. Such devices are of little use for detecting faults in their incipient stages. In the case of acetylene detectors, the extreme solubility of the gas makes it very unlikely that acetylene formed by an incipient fault will evolve into the gas layer, unless the fault is at or near the surface. If the fault is below the surface as most of them are in power transformers, the acetylene won't reach the gas layer unless its rate of formation is greater than the rate of solution. The limitations of using such a device to detect incipient fault are obvious.

Another factor which tends to limit the effectiveness of prior art protective devices is that there are always some non-inert type, contaminating gases present in a transformer system. Impurities are present in the inert gas from the start, and oil contains dissolved gases which may evolve from time to time. There may even be some gases present from prior intermittent faults or from leaks. These contaminants seriously limit the sensitivity of the prior art devices, and depending upon the particular equipment being used, many false indications of electrical fault may be given.

Generally speaking, therefore, the prior art protective devices are incapable of providing a clear cut, positive indication of trouble in the incipient stages of an electrical fault. Furthermore, these devices give may false indications of electrical fault where none in fact exists. And finally, even when they do show positively that there is a fault, the prior art devices do not provide any indication of the seriousness of the fault or any way of determining its progress.

Accordingly, it is an object of this invention to provide a method and apparatus for testing for electrical fault in oil-filled transformers having an inert gas cushion above the oil and in other electrical instrumentalities having a gas space.

It is an object of this invention to provide a method and apparatus of the above type which eliminates insofar as possible the disadvantages of the prior art.

It is also an object of this invention to provide a method and apparatus which can be used in conjunction with oil-filled transformers having a gas cushion above the oil for any and all of the following purposes: (1) detecting low-energy faults in their incipient stages, (2) evaluating the seriousness of such detected faults, (3) checking the progress of such faults and (4) determining when failure is threatened or imminent.

A further object of this invention is to provide a method and apparatus for testing for electrical fault wherein qualitative and quantitative type gas analysis are utilized for ascertaining gaseous products of thermal decomposition present in a gas space.

A still further object of this invention is to provide a method and apparatus as described above wherein the percentage of thermal decomposition products present in a gas space is determined by measuring the combustibility of a sample of the gas in the gas space.

Another object of this invention is to provide a method and apparatus of the aforementioned type which can be used for testing energized electrical units so as to obviate removing the units from service.

Still another object of this invention is to provide apparatus for the above-named purposes which is relatively inexpensive, portable, easy to manufacture and operate, and which can be used to make reliable, on-the-spot checks out in the field.

These and other objects and advantages of the invention will be apparent from the following detailed description when taken in conjunction with the accompanying drawings wherein:

FIG. 1 is an elevation view, partly in section, showing the new electrical fault testing apparatus connected to an oil filled transformer having an inert gas cushion above the oil.

FIG. 2 is an enlarged, semi-diagrammatic view in perspective of that part of FIG. 1 showing the new apparatus.

FIG. 3 is a flow diagram of the transformer fault testing system shown in FIGS. 1 and 2.

Broadly stated, we have discovered how to accurately detect and evaluate electrical fault in transformers of the inert gas space type using qualitative and quantitative gas analysis to determine products of thermal decomposition present in the inert gas space above the oil. We have found this gas analysis approach especially well suited for detecting products of thermal decomposition during the early stages of an electrical fault when these gases appear as extremely small percentages or traces. Prior to this invention it had not been possible to do this.

The problem of testing for electrical fault by determining the products of thermal decomposition present in the inert gas layer is complicated somewhat by impurities initially present in the inert gas. However, the standard range of impurities for commercial sources of nitrogen is from about 0.10 to about 0.30 percent by volume, and therefore the presence of more than 0.30% contaminating gases (non-inerts) in the inert gas layer of a transformer tends to indicate electrical fault, especially if the total contaminants are considerably in excess of 0.30%. Furthermore, the "initial impurities" problem can be obviated by making a plurality of tests at spaced time intervals, thus determining not only the total contaminants present in the inert gas but also the rate at which these contaminants are increasing.

Thus, although the invention can be used to a limited extent for "single test" fault detection, it will be apparent to those skilled in the art that a much more promising application is that of a continuing maintenance function.

By determining increases in the contaminants present in the inert gas layer of a transformer over a period of time, one can ascertain not only whether a fault exists but also the stage or seriousness of the fault.

There are several gas analyzers which can be used for qualitatively and quantitively determining the composition of gas samples; however, most of our early experimental work was done with a mass spectrometer, an expensive but accurate piece of laboratory equipment. This apparatus was used to investigate many different types of transformer fault. Gas bubbles generated experimentally by overheated copper wires, bad connections, heavy electrical corona, low energy sparking, etc.—all of which are possible in a transformer that is either improperly used or of inadequate construction—were captured and analyzed. Our study also included the analysis and comparison of gas bubbles formed by both disassociated oil and fibrous insulation. And finally, tests were run on samples of gas taken from energized transformers operating out in the field.

The mass spectrometer is obviously unsuited for field work, and therefore in using such equipment for testing energized transformers, it was necessary to remove samples of the inert gas from the units and send them back to the laboratory for analysis. The samples were taken and transported in stainless steel pressure tanks which worked very satisfactorily. However, such procedures are expensive and time consuming and obviously impractical. Hence in considering all these problems we discovered and invented a method and apparatus which can be used for making simple, accurate, on-the-spot checks right out in the field.

Our laboratory tests conducted upon samples of gas generated by different experimental electrical faults show that at least 18 different gases are formed by incipient fault; viz.

| Combustible gases: | Lower explosive limit (percent by volume in air) |
|---|---|
| $H_2$—Hydrogen | 4.1 |
| $CH_4$—Methane | 5.3 |
| $C_3H_8$—Propane | 2.37 |
| $C_2H_6$—Ethane | 3.12 |
| $C_2H_4$—Ethylene | 3.02 |
| $C_2H_2$—Acetylene | 2.5 |
| $C_4H_{10}$—Normal butane | 1.6 |
| $C_4H_{10}$—Isobutane | 1.9 |
| $C_5H_{12}$—Normal pentane | 1.4 |
| $C_5H_{12}$—Isopentane | ([1]) |
| $C_4H_8$—Butene | 1.7 |
| $C_3H_6$—Propylene | 2.0 |
| CO—Carbon monoxide | 12.5 |
| $C_4H_8$—Butylene | 1.7 |

Non-Combustible gases:
 $N_2$—Nitrogen
 $O_2$—Oxygen
 $CO_2$—Carbon Dioxide
 $A_2$—Argon

[1] Explosion hazard unknown.

However, all of these gases generated by transformer faults are not necessarily found in the inert gas space of the transformer. Furthermore, the relative concentration of those gases which do appear may vary appreciably with different samples. This is partly due to the different solubilities of the various gases, and the effect thereon of temperature and pressure. But there is also some variation due to differences in the types and temperatures of electrical faults. We have found, for example, that the relative amounts of the different gases formed depend somewhat upon the temperature of thermal decomposition; and that the generated gas will contain more CO and $CO_2$ if both oil and paper insulation are disassociated than if only oil is.

Although there is some variation in the gases evolved by different electrical faults, it is evident from the table that practically all the products of thermal decomposition are combustibles. In fact, for any given electrical fault, upwards of 95% of the gases generated will burn. Therefore, a determination of the amount of combustible gases generated by an electrical fault is roughly a determination of the total gases generated. This approximation is especially valid in view of the rather small percentages of thermal decomposition products that are normally found in an inert gas layer of a transformer.

The percentage concentration of a single combustible gas in air can be easily and accurately determined with a combustible gas indicator, such as the ones manufactured by Mine Safety Appliances Co. of Pittsburgh, Pennsylvania. Such a combustible gas indicator includes a balanced Wheatstone bridge having identical platinum wire detector and compensator filaments and is calibrated for the particular combustible gas being determined. The two platinum wire filaments are heated to a relatively low temperature by current from flashlight size batteries. The combustible-gas-in-air sample is drawn through the instrument at a fixed rate by using an attached aspirator, the heated detector filament being thus exposed to the action of the gas sample. Combustible gas in the sample is oxidized or burned catalytically on the platinum wire detector filament and the increased temperature from this combustion increases the electrical resistance of the wire. The increase in resistance is proportional to the amount of the combustible gas in the sample and is measured by a meter.

Actually, the combustible gas indicator is calibrated to read in percent explosiveness. However, a full scale reading corresponds to the lower explosive limit of the gas being detected, and since this limit is a fixed, definite percent the meter also gives an absolute indication of the percent of the combustible gas present in the air.

As previously indicated, the combustible gas indicator is used for determining the percent of a given combustible gas in air. It cannot be used as such for determining the percent of combustible gases present in the inert gas of a transformer. First of all, there is little if any oxygen present in the inert gas and the combustible gas indicator needs an excess of oxygen to operate. And secondly, the indicator is calibrated for a single gas of known combustibility, whereas there are many gases of varying degrees of combustibility present in the inert gas layer of a transformer.

The new fault testing apparatus is in effect a modification of the M.-S.-A. combustible gas indicator in which the above-mentioned problems have been eliminated, and accordingly it can be used for determining the amount of combustible gases present in the inert gas layer of a transformer. The equipment can be connected directly to the sampling valve of a transformer and includes means for mixing the gas samples with a measured volume of air prior to drawing the sample past the detector element. The apparatus is calibrated on the basis of an estimated or weighted average combustibility figure for the products of thermal decomposition.

From the table it is apparent that with the exception of carbon monoxide the combustibilities of the different gases generated by electrical faults are fairly uniform. Their lower explosive limits range from 1.4% by volume in air to 5.3%. Although the combustibility of carbon monoxide is somewhat less than the other gases, its effect on the combustibility of the generated gas is practically nil because of the extremely small amounts of carbon monoxide formed. By far the greatest percent of gases generated by any electrical fault are those constituting the first five members of the table (hydrogen, methane, propane, ethane and ethylene). Furthermore, the relative amounts of these gases formed by different electrical faults are fairly uniform.

On the basis of the above, we estimated that the combustible gases generated by electrical fault have a weighted-average lower explosive limit of about three percent (3%) by volume in air. This figure was used to calibrate the new fault testing apparatus so that the meter indicates the percent of total combustibles in the inert gas sample tested.

The new testing apparatus has been checked from time to time using both a mass spectrometer and a gas partitioner analyzer. The percentages indicated by the meter for total combustibles have been found to be consistently well within 10 percent of the true value. The significance of this becomes apparent when one considers the small percentages of combustibles ordinarily involved.

The new fault testing apparatus can best be understood by referring to the embodiment of the invention shown in the drawings:

In FIG. 1 the fault testing device, generally designated 10, is shown connected to the gas sampling valve 11 of transformer 12 by a flexible, plastic tube 13. The transformer 12 is oil-filled 14 and has an inert gas space 15 above the oil.

The new apparatus 10 is encased within a wear resistant box 16 for ease of handling and to protect the equipment from the elements when not in use. The box is normally equipped with doors (not shown) and could be permanently mounted on a transformer, but this is generally not contemplated inasmuch as it is more economical to use a single piece of equipment for testing as many transformers as possible.

Mounted to one side within the casing 16 are two vertical, calibrated glass gas chambers 20 and 21, both of which have valves at the top and at the bottom. Chamber 20 is the gas sample and mixing chamber. The valves 22 and 23 are two-way valves which remain in the open position shown in FIGURE 3 except when the equipment is being transported. Valve 24 at the top of chamber 21 is a three-way valve which can be opened to the atmosphere.

The gas chambers 20 and 21 are both partially filled with salt solution which is free to move from one chamber to the other through the tubing 25 connecting valves 22 and 23. Salt solution is used instead of plain water because gases are generally less soluble in salt solution.

The valve 26 at the top of the sample chamber 20 is a four-way valve which can be turned to any of the positions shown in FIGURES 3, 3a, 3b, 3c and 3d. In FIGURE 3 the valve is shown in the closed position. By turning valve 26 to the position shown in FIGURE 3a, the sample chamber is opened to the air. This position is used whenever gases are being purged from the sample chamber or when air is being introduced. It is also through valve 26 that samples of the gas 15 in the transformer 12 are introduced into the sample chamber 20, valve 26 being connected to the sampling valve 11 of the transformer by a flexible tube 13 as previously indicated.

Sample chamber 20 is connected to the gas combustion chamber 30 by a flexible tube 31 which is attached to the sample chamber at valve 26. Sump 32 and filter chamber 33 are positioned for protective purposes between the sample chamber and the combustion chamber. The sump keeps free oil and/or water from being drawn from the sample chamber into the combustion chamber, and the filter excludes foreign solids. A cotton filter is generally sufficient, but if the sample being tested contains oil vapor a charcoal filter is used. Combustion chamber 30 has wire mesh flashback arresters 34 at both ends to keep fire from feeding out of the chamber.

The flow of gases within the system is controlled by pressure supplied by aspirators 35 and 36 at opposite ends of the system. Aspirator 35 is connected to the three-way valve 24 of chamber 21 by flexible tubing 37. This aspirator 35 has an intake valve (not shown) at one end and an exhaust valve (not shown) at the other. It is reversible and can be used to supply either a positive or negative pressure to the surface of the salt solution in chamber 21 by connecting the proper end to the tubing 37.

Aspirator 36 is connected to the combustion chamber 30 by tubing 38. This aspirator has a regulator valve 39 at one end and an exhaust valve (not shown) at the other, and is non-reversible. It is used for drawing samples of gas through the combustion chamber 30 at a fixed rate.

The valves at the opposite ends of aspirators 35 and 36 are all check valves. They prevent any uncontrolled flow of gases into and out of the system.

The bridge circuit is designated generally as 40 and has two platinum wire filaments 41 and 42. Filament 41 is a detector element and is positioned within the combustion chamber 30. Filament 42 is the standard element. The low voltage electrical current is provided by battery 43 which is controlled by a switch 44. The E.M.F. of battery 43 decreases with use and therefore voltage adjustments are made from time to time by turning the knob 45 to vary the resistance 46. Bridge circuit 40 also includes a meter 47, which determines any imbalance of the bridge. Balance adjustments are made with a second variable resistance 48 using knob 49.

The meter 47 is calibrated to indicate the percent of combustibles present in a given sample. A first scale indicates percentages up to three percent. The meter also has a second, more sensitive scale (not shown) which ranges from zero to 0.30 percent. The increased sensitivity is effected by controlling the amount of current passing through the meter 47. This is done by having two shunt resistances 50 and 51 of 10 to 1 ratio adapted to be connected in parallel with the meter 47. A switch 52 determines which of the two resistances is connected and which scale to read.

In actual use the sensitivity of the new apparatus is affected by the amount of air mixed with samples before they are drawn through the combustion chamber. Normally, to simplify matters, an equal volume of air is mixed with the sample tested. This naturally decreases the sensitivity of the readings and, in effect, increases the ranges of the two scales to 6.0 percent and 0.60 percent respectively. Of course, if air is used in a ratio of other than one to one, the above figures must be adjusted accordingly. An example of this is when greater sensitivity is desired and less air is used.

At any rate, there must always be enough air mixed with the sample to completely burn all the combustibles therein. If there is not sufficient air, the meter will begin to rise, stop and return to zero as the oxygen is used up.

Before using the novel transformer-fault testing apparatus, gas remaining in sample chamber 20 from prior tests must be evacuated. This is done as follows. With valves 22, 23, and 24 aligned as shown in FIG. 3, valve 26 is opened to the atmosphere as shown in FIG. 3a. A positive fluid pressure is then applied through tube 37 and onto the upper surface of the salt solution in chamber 21 by using aspirator 35. This pressure forces the level of the salt solution in chamber 20. The application of pressure is continued until the level of the salt solution in chamber 20 rises up to valve 26, at which time valve 26 is turned to the closed position shown in FIG. 3.

A measured volume of air is then introduced into gas sample chamber 20. This as accomplished by applying a slight negative pressure to the system with the now reversed aspirator 35 and then opening valve 26 very cautiously to the atmosphere until the liquid level of the salt solution recedes to a predetermined calibration mark on chamber 20. The introduction and measuring of the air sample are, thus controlled entirely by valve 26, after which time valve 26 is once again in the position shown in FIG. 3.

The next step is to introduce an equal sample of gas from the transformer 12 into the gas sample chamber 20 but before doing this, the sampling tubing 13 must be purged. Normally the gas in the transformer is under a positive pressure and all that is required is to open the sampling valve 11 on the transformer and then turn valve 26 briefly to the position shown in FIG. 3b. However, if there is insufficient pressure within the transformer to drive the gas out, an aspirator may have to be used. At any rate, after the tubing 13 is purged a sample of the inert gas in the transformer is introduced into the gas sample chamber 20 by slowly turning valve 26 to the position shown in FIG. 3c in much the same manner as that used to introduce the sample of air, after which time the valve 26 is returned to the closed position shown in FIG. 3.

Before the "inert gas" and air samples in the chamber 20 are passed through the combustion chamber, they are mixed thoroughly together by agitating the salt solution in chamber 20. This can be accomplished with the valves in the positions shown in FIGURE 3 by applying either a positive or negative pressure with the aspirator 35. A negative pressure is generally used so that there will be less tendency to force any of the sample into the salt solution. The sample is then ready to be introduced into the combustion chamber.

In order to draw the sample from chamber 20, valve 26 is turned to the position in FIGURE 3d, and gas chamber 21 is opened to the atmosphere by turning valve 24 counterclockwise 90° from the position indicated in FIGURE 3. The sample can then be drawn through the tube 31, the sump 32, the filter 33 and the combustion chamber 30 by applying a negative pressure with the aspirator 36. The rate of flow of the gases is controlled and kept constant by the regulator valve 39 of aspirator 36.

Just prior to introducing the gas mixture into the combustion chamber 30, switch 44 is closed to permit the low voltage electrical current from battery 43 to flow through the circuit, thus causing detector element 41 and standard element 42 to heat up. The bridge circuit is then balanced by varying the resistance 48, using knob 49.

As the gas sample is drawn through the combustion chamber and past the hot detector element 41, any combustible gases in the mixture are catalytically oxidized or burned causing an increase in the temperature and resistance of detector element 41. This increased resistance causes an imbalance of the bridge circuit which is indicated by the meter 47 in percentage of combustibles. Because the sample has been mixed with air, the percent indicated is actually the concentration of combustibles in the sample and air mixture. Therefore, assuming an air to sample ratio of 1 to 1, the percentage indicated must be multiplied by two to determine actual percent of combustibles in the sample.

In making the test, the 0 to 3% scale is used first. If the meter indicates more than 3% combustibles in the mixture, another test is run using a greater proportion of air. If the percent of combustibles indicated in less than 0.3%, knob 52 is turned to the more sensitive scale.

In actual practice we have found that when the total combustibles in a transformer reach about 0.5% of the inert gas, the unit bears closer watching and should be tested more frequently. When the total combustibles reach about 1%, serious thought must be given to taking the unit out of service or else purging the system of explosive gases. Other than the above, perhaps the only generalization that can be made is that a system in which the amount of combustibles is increasing is obviously of greater concern than one in which the combustibles are constant or decreasing.

The new fault testing apparatus makes reliable, on-the-spot checks possible for oil filled transformers having an inert gas cushion. The operating conditions of doubtful units including very old ones can now be simply and accurately determined. Unexpected outages can be avoided, and equipment damage and repair costs can be miminized. Furthermore, it is now possible to acquire valuable background information on transformer systems before installing additional equipment by testing the units presently in service.

Although the invention has been described in relation to an oil filled transformer of the inert gas space type, it is to be understood that the invention also embraces testing other electrical instrumentalities.

While only a single embodiment of the invention has been illustrated and described, many modifications and variations thereof will be obvious to those skilled in the art, and consequently it is intended in the appended claims to cover all such modifications and variations which fall within the true spirit and scope of the invention.

We claim:

1. In a method of testing for incipient electrical fault in an encased electrical transformer having solid insulation immersed in liquid insulation within the casing and a layer of inert gas within the casing above the liquid insulation, the steps of taking a sample of said gas above said liquid insulation, measuring the percent by volume of combustible gases in said sample, and comparing said measured percent with a predetermined percent of combustibles which is a function of the lower explosive limit by volume in air of at least one of the gaseous products of thermal decomposition of said insulation resulting from electrical fault within said transformer.

2. In a method of testing for incipient, low-energy electrical fault in an encased, oil-filled electrical transformer having solid insulation immersed in the oil within the casing and an inert gas volume within said casing above the oil, the steps of taking a sample of a predetermined volume of said gas above said oil, mixing said sample with a predetermined volume of a combustion-supporting gas, passing the resulting mixture through a combustion chamber having a temperature sensitive element of catalytic material therein, electrically heating said element to catalytically burn the combustible gases in said mixture, and measuring the change in conductivity of said element resulting from said burning as an indication of incipient electrical fault within said transformer.

3. In a method of testing for incipient electrical fault in an encased, oil-filled electrical transformer having solid insulation immersed in the oil within the casing and an inert gas volume within said casing above the oil, the steps of taking a sample of predetermined volume X of said gas above said oil, mixing said sample with a predetermined volume Y of combustion-supporting gas, passing the resulting mixture through a combustion chamber having a temperature sensitive element of catalytic material therein, electrically heating said element to catalytically burn said mixture, measuring the change in impedance of said element resulting from said burning, and comparing said measure change in impedance with a predetermined change in impedance of said element resulting from passing through said chamber and catalytically burning therein a mixture of a volume Y of said combustion-supporting gas and a volume X of a gas having a percentage of combustibles which is a function of the lower explosive limit by volume in air of at least one of the gaseous products of thermal decomposition of said oil and solid insulation resulting from an electrical fault within said casing.

4. In a method of testing for incipient, low-energy electrical fault in an encased, oil-filled electrical transformer having solid insulation immersed in the oil within the casing and an inert gas volume within said casing above the oil, the steps of taking a sample of predetermined volume X of said gas above said oil, mixing said gas with a predetermined volume Y of combustion-supporting gas, passing the resulting mixture through a combustion chamber having a temperature sensitive element of catalytic material therein, electrically heating said element to catalytically burn said mixture, measuring the change in conductivity of said element resulting from said burning, and comparing said measured change in conductivity with a predetermined change in conductivity of said element resulting from passing through said chamber and catalytically burning therein a mixture of a volume Y of said combustion-supporting gas and a volume X of a gas having a percentage of combustibles which is a weighted average of the lower explosive limit by volume in air of a plurality of the gaseous products of thermal decomposition of said oil and solid insulation resulting from an electrical fault within said casing.

5. In a method of testing an encased, oil-filled, electrical transformer having solid insulation immersed in the oil within the transformer casing and an inert gas layer above said oil for incipient electrical fault, the steps of taking a predetermined volume sample of said gas layer above said oil, mixing said sample with a predetermined volume of air, conducting the resulting mixture to a combustion chamber having a temperature sensitive impedance element therein, burning the combustible gases in said mixture within said combustion chamber, and measuring the change in impedance of said element resulting from said burning as an indication of electrical fault in said transformer.

6. In the method of testing an encased, oil-filled, electrical transformer having solid insulation immersed in the oil within the casing and an inert gas layer within the casing above the oil for incipient low-energy electrical fault, the steps of taking a sample of said gas layer above said oil, mixing said sample with a combustion-supporting gas, burning the combustible gases in the resulting mixture in a combustion chamber having a temperature sensitive impedance element therein, measuring the change in impedance of said element resulting from said burning, and comparing said measured change in impedance with a predetermined change in impedance of said element resulting from burning in said combustion chamber of a mixture of said combustion-supporting gas and a gas having a percentage of combustibles which is a function of the average of the lower explosive limit by volume in air of hydrogen, methane, propane, ethane and ethylene.

7. In the method of testing for incipient electrical fault in an encased, oil-filled electrical transformer having solid insulation immersed in the oil within the casing and a volume of inert gas within the casing above the oil, the steps of taking a sample of predetermined volume of said inert gas above the oil, mixing said sample with a predetermined volume of air, conducting the resulting mixture through a combustion chamber having a temperature sensitive catalytic first element therein and having associated therewith a second element exterior of said chamber having a resistance-temperature coefficient similar to that of said first element, passing electric current through said first and second elements in series to catalytically burn the combustible gases in said mixture, and comparing the change in resistance of said first element with the change in resistance of said second element as an indication of incipient electrical fault in said transformer.

8. In the method of testing for incipient, low-energy electrical fault in an encased, oil-filled electrical transformer having solid insulation immersed in the oil within the casing and a volume of inert gas within the casing above the oil, the steps of taking a sample of said gas above said oil, mixing the sample with a combustion-supporting gas, conducting the resulting mixture through a combustion chamber having a temperature sensitive catalytic element therein and also having associated therewith a second element exterior of said chamber having a resistance-temperature coefficient similar to that of said first element, passing electric current through said first element and second element in series to catalytically burn the combustible gases in said mixture, and comparing the change in conductivity of said first element with the change in conductivity of said second element as an indication of incipient electrical fault in said transformer.

9. In the method of testing for incipient electrical fault in an encased electrical transformer having solid insulation immersed in liquid insulation within said casing and an inert gas layer above said liquid insulation, the steps of taking a sample of said gas layer above said liquid insulation, mixing said sample with air, electrically heating a temperature sensitive impedance element of catalyzing material in a combustion chamber having means associated therewith for measuring the impedance of said element, calibrating said measuring means in terms of the conductivity of said element when a mixture is passed through said chamber of air and a gas having a percent of combustibles therein which is a function of the lower explosive limit by volume in air of the gaseous products of thermal decomposition of said insulation resulting from a fault within said transformer, passing said mixture of said sample and air through said chamber and concurrently determining the impedance of said element in said measuring means as an indication of electrical fault in said transformer.

10. In a method of testing for incipient electrical fault in an encased oil-filled electrical transformer having solid insulation immersed in the oil within the casing and a volume of inert gas within the casing above the oil, the steps of taking a sample of said inert gas above said oil, and measuring the percent by volume of combustible gases in said sample as an indication of incipient electrical fault in said transformer.

11. In the method of testing an encased, oil-filled, electrical transformer having solid insulation immersed in the oil within the casing and an inert gas layer above the oil for incipient, low-energy electrical fault, the steps of taking a sample of said gas layer above said oil, burning the combustible gases in said sample in a combustion chamber having a temperature sensitive impedance element therein, and measuring the change in impedance of said element resulting from said burning as an indication of incipient electrical fault in said transformer.

12. In the method of testing an encased, oil-filled electrical transformer having solid insulation immersed in the oil within said casing and an inert gas layer above said oil for incipient electrical fault, the steps of taking a sample of said gas layer above said oil, mixing said sample with air, passing the resulting mixture through a combustion chamber having a temperature-sensitive element of catalytic material therein, passing an electrical current through said element to catalytically burn the combustible gases in said mixture, and measuring the change in resistance of said element resulting from the burning of the combustible gases in said mixture as an indication of electrical fault in said transformer.

13. In the method of testing for incipient electrical fault in an encased electrical transformer having solid insulation immersed within liquid insulation in said casing and an inert gas layer above said liquid insulation, the steps of taking a sample of said gas layer above said liquid insulation, mixing said sample with a combustion-supporting gas, conducting the resulting mixture to a combustion cell having a catalytic element therein, heating said element electrically to catalytically burn said mixture in said cell, measuring the change in conductivity of said element resulting from said burning, and comparing said measured change of conductivity with a predetermined change of conductivity of said element which results when a mixture is burned in said cell of said combustion-supporting gas and a gas having a percentage of combustibles which is a function of the lower explosive limit in air of the combustible gaseous products of thermal decomposition of said insulation resulting from an electrical fault in said transformer.

References Cited in the file of this patent

UNITED STATES PATENTS

| | | |
|---|---|---|
| 1,748,719 | Kopeliowitsch et al. | Feb. 25, 1930 |
| 1,997,659 | Styer | Apr. 16, 1935 |
| 2,057,246 | Morgan et al. | Oct. 13, 1936 |
| 2,639,978 | Zaikowsky | May 26, 1953 |
| 2,922,700 | Lawhon | Jan. 26, 1960 |

---

UNITED STATES PATENT OFFICE

CERTIFICATE OF CORRECTION

Patent No. 3,111,388            November 19, 1963

Arnold L. Horelick et al.

It is hereby certified that error appears in the above numbered patent requiring correction and that the said Letters Patent should read as corrected below.

Column 9, line 14, for "comprising" read -- comparing --; line 46, for "measure" read -- measured --.

Signed and sealed this 28th day of April 1964.

(SEAL)
Attest:

ERNEST W. SWIDER            EDWARD J. BRENNER

Attesting Officer            Commissioner of Patents